(12) United States Patent
Shen et al.

(10) Patent No.: US 7,840,067 B2
(45) Date of Patent: Nov. 23, 2010

(54) COLOR MATCHING AND COLOR CORRECTION FOR IMAGES FORMING A PANORAMIC IMAGE

(75) Inventors: Junxing Shen, Hangzhou Zhejian (CN); Yushan Huang, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 1351 days.

(21) Appl. No.: 10/692,666

(22) Filed: Oct. 24, 2003

(65) Prior Publication Data

US 2005/0088534 A1 Apr. 28, 2005

(51) Int. Cl.
*G06K 9/00* (2006.01)
(52) U.S. Cl. .......... 382/170; 382/168; 382/165
(58) Field of Classification Search .......... 382/162–172
See application file for complete search history.

(56) References Cited

U.S. PATENT DOCUMENTS

| | | | | | |
|---|---|---|---|---|---|
| 4,504,972 | A | * | 3/1985 | Scherl et al. | 382/171 |
| 4,672,667 | A | * | 6/1987 | Scott et al. | 704/231 |
| 4,792,979 | A | * | 12/1988 | Nomura et al. | 382/169 |
| 5,689,575 | A | * | 11/1997 | Sako et al. | 382/118 |
| 5,734,740 | A | * | 3/1998 | Benn et al. | 382/132 |
| 5,832,110 | A | * | 11/1998 | Hull | 382/168 |
| 5,845,009 | A | * | 12/1998 | Marks et al. | 382/228 |
| 5,943,045 | A | * | 8/1999 | Ikeshoji et al. | 382/162 |
| 6,349,153 | B1 | * | 2/2002 | Teo | 382/294 |
| 6,483,940 | B1 | * | 11/2002 | Wang | 382/164 |
| 6,621,923 | B1 | * | 9/2003 | Gennetten | 382/162 |
| 6,631,212 | B1 | * | 10/2003 | Luo et al. | 382/228 |
| 6,678,408 | B1 | * | 1/2004 | Ruggiero et al. | 382/168 |
| 6,711,287 | B1 | * | 3/2004 | Iwasaki | 382/165 |
| 6,731,792 | B1 | * | 5/2004 | Tanaka | 382/164 |
| 6,741,655 | B1 | * | 5/2004 | Chang et al. | 375/240.26 |
| 6,798,321 | B2 | * | 9/2004 | Hallbjorner | 335/78 |
| 6,798,921 | B2 | * | 9/2004 | Kinjo | 382/282 |
| 6,839,461 | B2 | * | 1/2005 | Tomomatsu | 382/170 |
| 6,859,552 | B2 | * | 2/2005 | Izume et al. | 382/170 |
| 6,975,758 | B2 | * | 12/2005 | Nicolas | 382/165 |
| 7,016,078 | B2 | * | 3/2006 | Shoji | 358/1.9 |

(Continued)

OTHER PUBLICATIONS

Szeliski et al. "Creating Full View Panoramic Image Mosaics and Environment Maps", 1997, Microsoft Research, Proceedings of the 24th Annual Conference on Computer Graphics and Interactive Techniques, pp. 251-258.*

(Continued)

*Primary Examiner*—Bhavesh M Mehta
*Assistant Examiner*—Mia M Thomas
(74) *Attorney, Agent, or Firm*—Patent Law Group LLP; David C. Hsia

(57) ABSTRACT

A method for color matching a first image and a second image, wherein a first region of the first image and a second region of the second image overlap, includes removing overlapping pixels in the first and the second regions that have pixel values are too different, generating a first histogram of the first region, generating a second histogram of the second region, determining corresponding pixel values in the first and the second histograms, determining parameters of an optoelectronic conversion function that matches the corresponding pixel values, and color matching the second image to the first image by applying the optoelectronic conversion function with the determined parameters to the second image.

20 Claims, 4 Drawing Sheets
(1 of 4 Drawing Sheet(s) Filed in Color)

U.S. PATENT DOCUMENTS

| | | | | |
|---|---|---|---|---|
| 7,149,325 | B2* | 12/2006 | Pavlidis et al. | 382/103 |
| 7,215,812 | B1* | 5/2007 | Masaki | 382/167 |
| 7,336,817 | B2* | 2/2008 | Kasperkiewicz et al. | 382/162 |
| 7,436,437 | B2* | 10/2008 | Fletcher et al. | 348/208.6 |
| 7,564,601 | B2* | 7/2009 | Angal et al. | 358/504 |
| 2001/0036311 | A1* | 11/2001 | Tomomatsu | 382/168 |
| 2002/0102022 | A1* | 8/2002 | Ma et al. | 382/170 |
| 2002/0172417 | A1* | 11/2002 | Nicolas | 382/165 |
| 2002/0172420 | A1* | 11/2002 | Nicolas | 382/170 |
| 2003/0035592 | A1* | 2/2003 | Cornog et al. | 382/284 |
| 2003/0086606 | A1* | 5/2003 | Hunter et al. | 382/167 |
| 2003/0103677 | A1* | 6/2003 | Tastl et al. | 382/240 |
| 2003/0152266 | A1* | 8/2003 | Ivers et al. | 382/169 |
| 2004/0028271 | A1* | 2/2004 | Pollard et al. | 382/162 |
| 2004/0197021 | A1* | 10/2004 | Huang et al. | 382/162 |
| 2004/0257477 | A1* | 12/2004 | Ikeda et al. | 348/725 |
| 2004/0264806 | A1* | 12/2004 | Herley | 382/284 |
| 2005/0041261 | A1* | 2/2005 | Narushima et al. | 358/1.9 |
| 2005/0088534 | A1* | 4/2005 | Shen et al. | 348/218.1 |
| 2005/0169555 | A1* | 8/2005 | Hasegawa | 382/284 |
| 2005/0185837 | A1* | 8/2005 | Takano et al. | 382/162 |
| 2006/0104535 | A1* | 5/2006 | Varekamp | 382/260 |
| 2006/0231735 | A1* | 10/2006 | Shen | 250/208.1 |
| 2007/0031034 | A1* | 2/2007 | Rising et al. | 382/170 |
| 2007/0047809 | A1* | 3/2007 | Sasaki | 382/170 |
| 2007/0172121 | A1* | 7/2007 | Masaki | 382/170 |

OTHER PUBLICATIONS

Press et al. "10.1 Golden Section Search in One Dimension", pp. 397-402.*

Hasler et al. "Mapping Colour in Image Stitching Applications", Dec. 21, 2001, pp. 1-29.*

Hasler et al. "Modelling the OptoElectronic Conversion function (OECF) for application in the Stitching of Panoramic Images" Audiovisual Communications Laboratory, pp. 1-2.*

Ni et al. "Histogram Equalization based Adaptive Image Sensor for Real-Time Vision" pp. 1-4.*

Chan et al. "An Improved Super Resolution with Manifold Learning and Histogram Matching" Spring Verlag Heidelburg 2005, pp. 756-762.*

NPL Google Search—see attached.*

Tomoo Mitsunaga et al., "Radiometric Self Calibration", in Proceedings of IEEE Conference on Computer Vision and Pattern Recognition, Fort Collins, Jun. 1999, 7 pages.

David Hasler et al., "Mapping Colour in Image Stitching Applications", accepted to J. Visual Communication and Image Representation, Jun. 4, 2003, 21 pages.

David Hasler et al., "Mapping Colour in Image Stitching Applications", J. Visual Communication and Image Representation, Dec. 2001, 21 pages.

David Hasler et al., "Modelling the Opto-Electronic Conversion Function (OECF) for application in the stitching of panoramic images", Proc. ICIS 2002, pp. 379-380, 2002.

Jan Morovic et al., "A fast, non-iterative and exact histogram matching algorithm", Elsevier Science B.V., Journal PATREC, Article No. 2827, Dispatch Aug. 1, 2001, pp. 1-9.

"Golden Section Search in One Dimension", sample page from Numerical Recipes in C: The Art of Scientific Computing, (ISBN 0-521-43108-5) Copyright (C) 1988-1992 by Cambridge University Press, pp. 397-402.

* cited by examiner

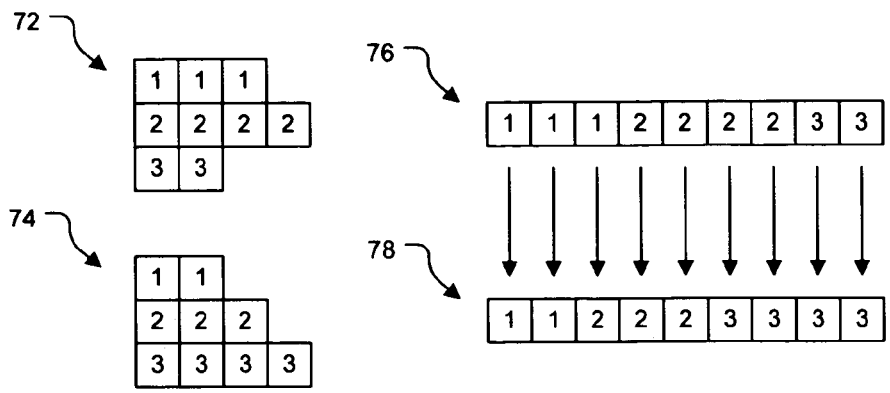
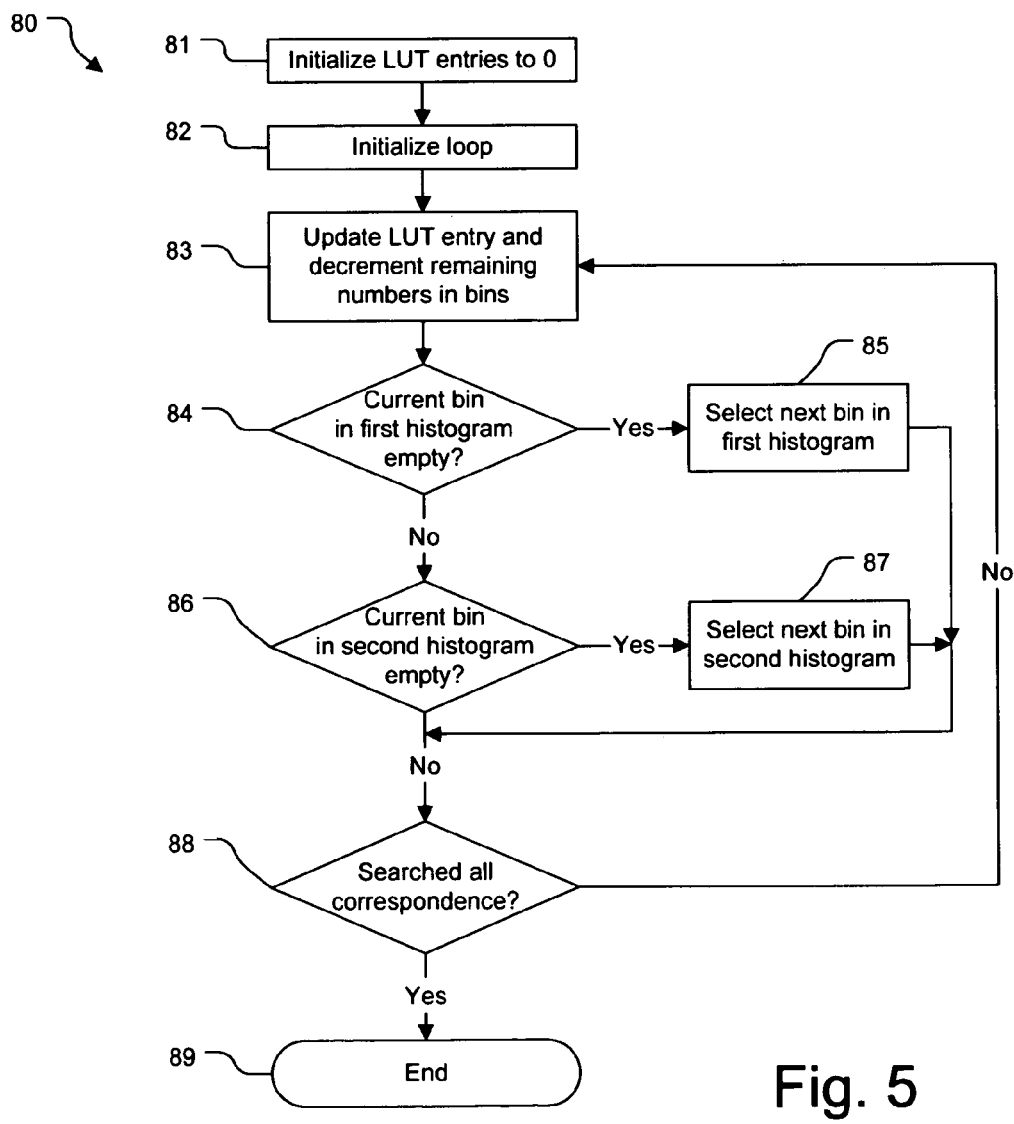
Fig. 4
Fig. 5

US 7,840,067 B2

COLOR MATCHING AND COLOR CORRECTION FOR IMAGES FORMING A PANORAMIC IMAGE

FIELD OF INVENTION

This invention relates to color correction to images to make up a panoramic image.

DESCRIPTION OF RELATED ART

When a photographer captures a scene using a camera, the desired field of view may be larger than the normal field of view of the camera. Digital photography allows a panoramic image to be produced without the need of purchasing special equipment such as a panoramic camera or fisheye lenses. For example, a photographer with a digital camera may capture a series of digital pictures of a scene by rotating the camera and taking pictures in a sequence. The captured images may then be stitched together to produce a panoramic picture of the scene. Similarly, film-based photographs can be digitized, and the panoramic picture can be composed by stitching together the digitized images. Presently, digital image programs are available for stitching multiple digital images together to form a panoramic picture. Exemplary programs include Ulead Cool 360®, Live Picture PhotoVista®, and MGI PhotoSuite III®.

Even when the stitching process works successfully, one may notice that the colors in the images do not match. This is due to differences in exposure and in the white balancing between the images. Thus, what is needed is a method to correct the colors in the images that make up the panoramic image to make the panoramic more realistic.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 4 illustrates the concept of histogram matching in the method of FIG. 2 in one embodiment of the invention.

FIGS. 5 and 6 illustrate the implementation of histogram matching in the method of FIG. 2 in one embodiment of the invention.

SUMMARY

In one embodiment of the invention, a method for color matching a first image and a second image, wherein a first region of the first image and a second region of the second image overlap, includes removing overlapping pixels in the first and the second regions that have pixel values are too different, generating a first histogram of the first region, generating a second histogram of the second region, determining corresponding pixel values in the first and the second histograms, determining parameters of an optoelectronic conversion function that matches the corresponding pixel values, and color matching the second image to the first image by applying the optoelectronic conversion function with the determined parameters to the second image.

DETAILED DESCRIPTION

Figure 1:
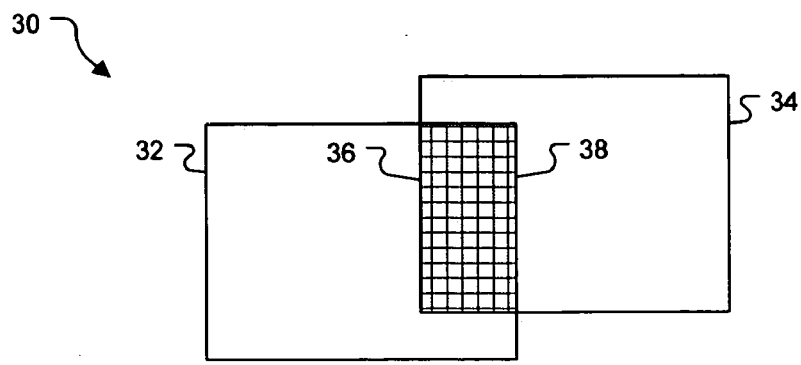
FIG. 1 illustrates two images stitched together to form a panoramic image in one embodiment of the invention.

FIG. 1 illustrates a panoramic image 30 consisting two images 32 and 34 that are stitched together in one embodiment of the invention. A panoramic program has been used to determine a region 36 of image 32 and a region 38 of image 34 that overlap. The same panoramic program has stitched (i.e., aligned) images 32 and 32 to overlap in regions 36 and 38.

Figure 2:
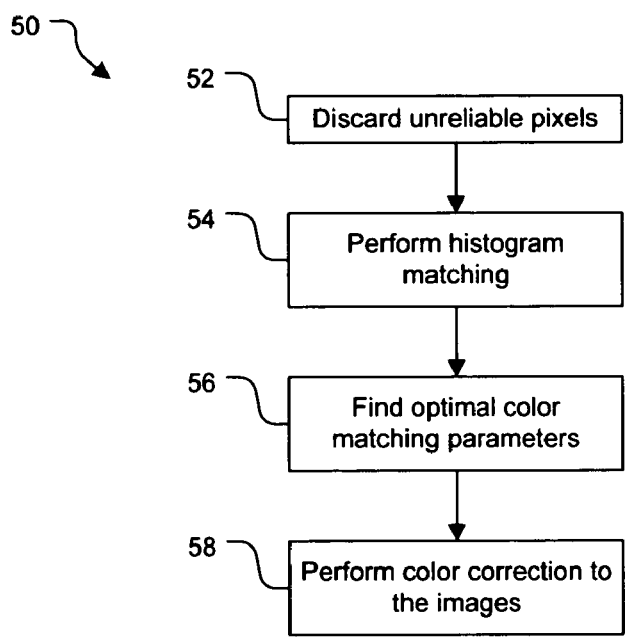
FIG. 2 is a flowchart of a method for color matching the two images of FIG. 1 in one embodiment of the invention.

FIG. 2 is a flowchart of a method 50 for a panoramic program to color match images (e.g., images 32 and 34 in FIG. 1) that overlap in one embodiment of the invention. The panoramic program can be executed by any computer system (e.g., a processor and a memory).

Figure 3:
FIG. 3 illustrates outliers discarded by the method of FIG. 2 in one embodiment of the invention.

In step 52, the system discards pairs of overlapping pixels in regions 36 and 38 that are unreliable for color matching. A pair of overlapping pixels is unreliable if the difference of brightness, (e.g., (R+G+B)/3), between the overlapping pixels is too great. In one embodiment, a pair of overlapping pixels is unreliable when it is among the 10 percent of the overlapping pixels that have the highest brightness difference. FIG. 3 illustrates an example of discarded overlapping pixels in regions 36 and 38. It can be seen that most discarded overlapping pixels are part of moving objects, edges, and regions with abundant texture that cannot be aligned between regions 36 and 38.

In step 54, the system performs a conventional histogram matching for the remaining overlapping pixels in regions 36 and 38. The concept of histogram matching is first explained in reference to FIG. 4. First, the system generates a histogram 72 for region 36 and a histogram 74 for region 38 as shown. Each histogram has pixel value intensity bins that store the units of pixels that have the corresponding pixel values of the bins. The bins of histogram 72 and laid end-to-end in ascending (or descending) bin order to form a series 76. Similarly the bins of histogram 74 are laid end-to-end in ascending bin order to form a series 78. The corresponding pixels between regions 36 and 38 are then assumed to have the pixel values in the corresponding horizontal locations along series 76 and 78 regardless of their actual positions in regions 36 and 38.

Figure 6:
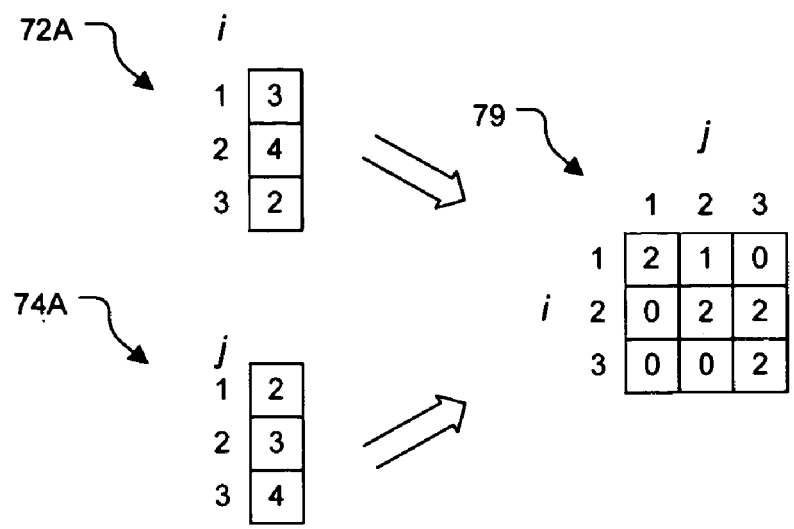

One implementation of histogram matching is now explained in reference to FIGS. 5 and 6. In method 80, parameters i and j indicate the bins in histogram 72A and 74A, parameters rem1 and rem2 indicate the remaining numbers of pixels in the bins, and min_rem indicates the minimum remaining number between rem1 and rem2.

In step 81, the system initializes all the entries in a lookup table (LUT) 79. Each entry LUT[i][j] in LUT 79 records the number of pairs of corresponding pixel values having a pixel value corresponding to a bin i in histogram 72A and a pixel value corresponding to a bin j in histogram 74A.

In step 82, the system initializes the first loop through method 80. Specifically, the system sets i=0 and j=0. The system also sets a parameter rem1=h1[0] and rem2=h2[0], where h1[ ] is the number of pixels having a certain pixel value in histogram 72A, and h2[ ] is the number of pixels having a certain pixel value in histogram 74A.

In step 83, the system updates the correspondence between the pixels in the current bins of histogram 72A and 74A in LUT 79 by setting min_rem=min(rem1, rem2) and incrementing LUT[i][j] by min_rem. The system also decrements the remaining numbers of pixels in the current bins by setting rem1=rem1−min_rem, and rem2=rem2−min_rem.

In step 84, the system determines if the current bin in histogram 72A is empty because its pixels have all been matched to corresponding pixels in histogram 74A. The system does this by determining if rem1=0. If so, step 84 is followed by step 85. Otherwise step 84 is followed by step 86.

In step 85, the system selects the next bin in histogram 72A by incrementing parameter i. The system also tracks the number of pixels remaining in the next bin by setting rem1=h1[i]. Step 85 is followed by step 88.

In step 86, the system determines if the current bin in histogram 74A is empty because its pixels have all been matched to corresponding pixels in histogram 72A. The system does this by determining if rem2=0. If so, step 86 is followed by step 87. Otherwise step 86 is followed by step 88.

In step 87, the system selects the next bin in histogram 74A by incrementing parameter j. The system also tracks the number of pixels remaining in the next bin by setting rem2=h2[i]. Step 87 is followed by step 88.

In step 88, the system determines if all the pixels in histograms 72A and 74A have been matched. The system does this by determining if i<256 and j<256. If so, then step 88 is followed by step 89, which ends method 80. Otherwise step 88 is followed by step 83 and method 80 repeats until the correspondence between the pixels in histograms 72A and 74A have been recorded in LUT 79.

For simplicity, only one histogram per overlapping region is shown. In actual application to color images, there would be a histogram for each color component per overlapping region. In other words, there would be a histogram for the R values, a histogram for the G values, and a histogram for the B values in region 36. Similarly, there would be a histogram for the R values, a histogram for the G values, and a histogram for the B values in region 38.

Referring back to step 56 of method 50 in FIG. 2, the system finds optimal parameters for an optoelectronic conversion function (OECF) that best matches the colors of regions 36 and 38. In one embodiment, the system uses a conventional Laguerre OECF is defined as follows:

$$S(x) = x + \frac{2}{\pi} \arctan\left(\frac{a \sin(\pi x)}{1 - a \cos(\pi x)}\right), \quad (1)$$

where S( ) is the actual pixel value of a pixel in a scene, x is the pixel value of that pixel in an image of the scene, and $a \in (-1,1)$ is an unknown parameter of the OECF. It has been mathematically proven that when parameter x is normalized to (0,1), S( ) is monotonic and its inverse is simply found by changing the sign of parameter a. To color match regions 36 and 38, the system minimizes a conventional color matching error defined as follows:

$$e = \sum_{x_1 \in R_1, x_2 \in R_2} \|S(x_1) - \tau S(x_2)\|^2, \quad (2)$$

where e is the color matching error, $R_1$ and $R_2$ are the overlapping regions in two images to be stitched, $x_1$ and $x_2$ are the corresponding pixel values of a single pixel in the scene, S( ) is the OECF, and τ accounts for the difference in exposure and white balancing of the two overlapping regions. If τ and the OECF are both unknown, then the minimum of color matching error e has a trivial and degenerate solution: τ=1, S(x)= const. To avoid this problem, Equation 2 can be expressed in the equalized images space as follows:

$$e = \sum_{x_1 \in R_1, x_2 \in R_2} \|x_1 - S^{-1}(\tau S(x_2))\|^2, \quad (3.1)$$

where $S^{-1}$ is the inverse OECF. To be used with the LUT generated by histogram matching above, equation 3.1 is rewritten as:

$$e = \sum_{i=0}^{255} \sum_{j=0}^{255} LUT[i][j]((i+1)/256.0 - S^{-1}(\tau S((j+1)/256.0))). \quad (3.2)$$

In equation 3.2, LUT[i][j] is used to determine how many pairs of corresponding pixels that have the pixel value of bin i and the pixel value of bin j, and (i+1)/256 and (j+1)/256 are used to normalize the pixel values to determine their difference using the Laguerre OECF.

From experience, it has been determined that τ has a unimode effect on the color correction results, in that there is a single optimal τ that gives better results than all other values. Thus, the system performs a golden section search on Equation 3.2 to find optimal τ with high convergence speed.

Figure 7:
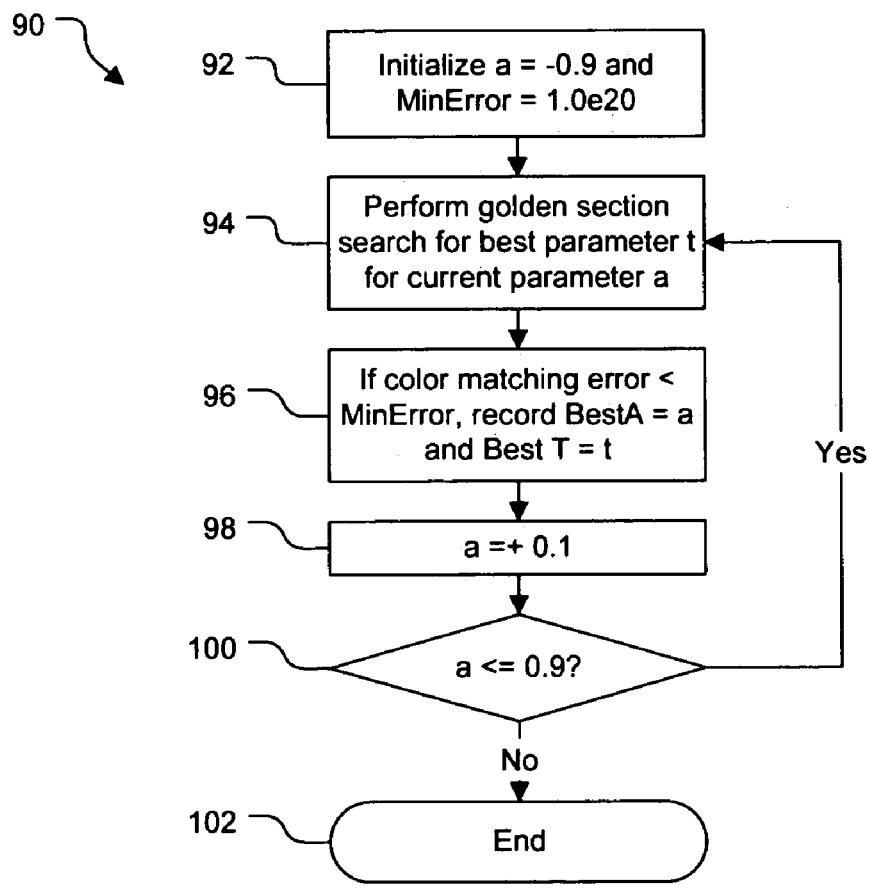
FIG. 7 is a flowchart of a method for optimizing a golden section search of the method of FIG. 3 in one embodiment of the invention.

FIG. 7 is a flowchart of a method 90 for optimizing the golden section search in one embodiment.

In step 92, the system initializes parameter a to −0.9, and a parameter MinError to a large number (e.g., 1.0e20). System uses parameter MinError to track the smallest color matching error e through iterations of method 90.

In step 94, the system performs a conventional golden section search with parameter a being fixed and parameter τ being varied.

In step 96, the system saves the best result of the golden section search. Specifically, if a color matching error e generated with a particular combination of parameters a and τ is less than parameter MinError, the system sets parameter MinError equal to that color matching error e and saves the current parameters a as a parameter BestA and τ as a parameter BestT. This is repeated until the system has tried a range of parameter τ for the current parameter a.

In step 98, the system increments parameter a by 0.1.

In step 100, the system determines if parameter a is less than or equal to 0.9. If so, step 100 is followed by step 94 and method 90 repeats until the system has performed the gold section search for a range of parameters a and τ. If parameter a is not less than or equal to 0.9, step 100 is followed by step 102, which ends method 90 because the system has found the optimal parameters a and τ.

For simplicity, only one OECF and one color matching error e are listed above. In actual application to color images, there would be three OECFs and three color matching errors e for each color component. In other words, there would be $S_R$, $a_R$, $\tau_R$, and $e_R$ for the R values, $S_G$, $a_G$, $\tau_G$, and $e_G$ for the G values, and $S_B$, $a_B$, $\tau_B$, and $e_B$ for the B values.

Referring back to step 58 of method 50 in FIG. 2, the system then applies the OECF with the optimal parameters a and τ to color match image 34 to image 32. Specifically, the system applies the following color correction to image 34:

$$x_c = S^{-1}(\tau S(x_o)), \quad (4.1)$$

wherein $x_c$ is the corrected pixel value of a pixel in image 34, and $x_o$ is the original pixel value of a pixel in image 34. Equation 4.1 can be written for each color component as follows:

$$[R_c, G_c, B_c] = [S_R^{-1}(\tau_R S_R(R)), S_G^{-1}(\tau_G S_G(G)), S_B^{-1}(\tau_B S_B(B))] \quad (4.2)$$

wherein $R_c$, $G_c$, and $B_c$ are the corrected pixel values of the pixels in image 34, and R, G, B are the original pixel values of the pixels in image 34.

A pixel saturation problem exists when applying Equation 4.2 for color matching image 34 to image 32. If parameter $\tau$ is greater than 1, $\tau S(x)$ will be easily greater than 1. Thus, $\tau$ has to be weighted according to the pixel value. In one embodiment, a linear weighing function is determined experimentally to give good result is defined as follows:

$$x_c = S^{-1}(W(\tau, x_o) S(x_o)), \text{ or} \quad (5.1)$$

$$[R_c, G_c, B_c] = [S_R^{-1}(W(\tau_R, R) S_R(R)), S_G^{-1}(W(\tau_G, G) S_G(G)), S_B^{-1}(W(\tau_B, B) S_B(B))], \quad (5.2)$$

where W is the weighing function defined as:

$$W(\tau, x_o) = \tau + (1-\tau) x_o. \quad (6)$$

Figure 8:
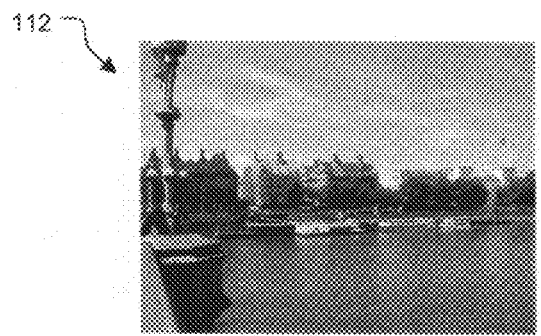
FIGS. 8, 9, and 10 illustrate the result of color matching two images stitched together to form a panoramic image using the method of FIG. 2 in one embodiment of the invention.
Figure 9:
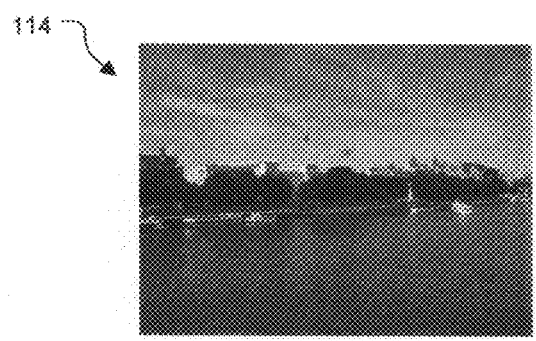
Figure 10:
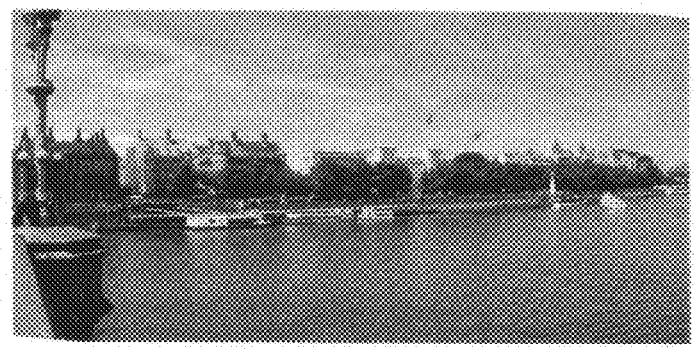

FIGS. 8 and 9 illustrate images 112 and 114 that are to be stitched together and then color matched using method 50 described above to form a panoramic image 116 in FIG. 10 in one embodiment of the invention. As can be seen, color consistency between images 112 and 114 has been greatly improved with method 50.

Various other adaptations and combinations of features of the embodiments disclosed are within the scope of the invention. Numerous embodiments are encompassed by the following claims.

What is claimed is:

1. A method for a processor to color match a first image and a second image, wherein a first region of the first image and a second region of the second image overlap, the method comprising:
   generating a first histogram of the first region;
   generating a second histogram of the second region;
   determining corresponding pixel values from the first and the second histograms;
   determining at least one parameter of an optoelectronic conversion function (OECF) that best matches the corresponding pixel values; and
   color matching the second image to the first image by applying the OECF with the at least one parameter to the second image.

2. The method of claim 1, further comprising, prior to said generating a first histogram and generating a second histogram:
   removing a percentage of overlapping pixels with the greatest difference in brightness.

3. The method of claim 1, wherein:
   said generating a first histogram comprises recording in a first plurality of pixel value bins a first plurality of numbers of pixels that have respective pixel values in the first region; and
   said generating a second histogram comprises recording in a second plurality of pixel value bins a second plurality of numbers of pixels that have the respective pixel values in the second region.

4. The method of claim 3, wherein said determining corresponding pixel values from the first and the second histograms comprises generating a lookup table (LUT) storing a third plurality of numbers of pixels and their corresponding pixel values.

5. The method of claim 4, wherein said generating a lookup table comprises:
   (1) initializing all entries in the LUT to 0;
   (2) initializing a first loop by setting i=0; j=0; rem1=h1[0]; and rem2=h2[0];
   (3) updating the LUT by setting min_rem=min(rem1, rem2); rem1=rem1−min_rem; and rem2=rem2−min_rem; and incrementing LUT[i][j] by min_rem;
   (4) when rem1=0, then incrementing i and setting rem1=h1[i];
   (5) when rem2=0, then incrementing j and setting rem2=h2[j];
   (6) when i<256 and j<256, then repeating steps (3) to (5);
   wherein h1[ ] is the number of pixels having a certain pixel value in the first histogram, h2[ ] is the number of pixels having a certain pixel value in the second histogram, and LUT[ ][ ] is the number of pairs of corresponding pixel values having a certain pixel value in the first histogram and a certain pixel value in the second histogram.

6. The method of claim 5, wherein said determining at least one parameter of an OECF comprises minimizing a color matching error, the color matching error being defined as:

$$e = \sum_{i=0}^{255} \sum_{j=0}^{255} LUT[i][j]((i+1)/256.0 - S^{-1}(\tau S((j+1)/256.0))),$$

wherein e is the color matching error, $\tau$ is a color matching parameter, S( ) is the OECF, and $S^{-1}$( ) is the inverse of the OECF.

7. The method of claim 6, wherein the OECF is defined as:

$$S(x) = x + \frac{2}{\pi} \arctan\left( \frac{a \sin(\pi x)}{1 - a \cos(\pi x)} \right),$$

wherein x is a pixel value normalized to (0,1), and $a \in (-1,1)$ is another color matching parameter.

8. The method of claim 7, wherein said minimizing a color matching error comprises performing a golden section search of the color matching error.

9. The method of claim 8, wherein said performing a golden section search comprises:
   (1) initializing the another color matching parameter and a minimum color matching error;
   (2) performing the golden section search with the another color matching parameter being fixed and the color matching parameter being varied to determine a smallest color matching error achieved;
   (3) recording values of the color matching parameter and the another color matching parameter that achieve the smallest color matching error when the smallest color matching error is less than the minimum color matching error;
   (4) setting the minimum color matching error equal to the smallest color matching error when the smallest color matching error is less than the minimum color matching error; and
   (4) repeating steps (2) to (4) for a range of values of the another color matching parameter.

10. The method of claim 6, wherein said applying the OECF comprises:

$$x_c = S^{-1}(W(\tau, x_o)S(x_o))$$

wherein $x_o$ is an original pixel value in the second image, $x_c$ is a corrected pixel value in the second image, and W is a weight function defined as:

$$W(\tau, x_o) = \tau + (1-\tau)x_o.$$

11. The method of claim 1, wherein the OECF is defined as:

$$S(x) = x + \frac{2}{\pi}\arctan\left(\frac{a\sin(\pi x)}{1 - a\cos(\pi x)}\right),$$

wherein S( ) is the OECF, x is a pixel value normalized to (0,1), and a∈(−1,1) is a first color matching parameter.

12. The method of claim 11, wherein said determining at least one parameter of an OECF comprises minimizing a color matching error defined as:

$$e = \sum_{x_1 \in R_1, x_2 \in R_2} \|x_1 - S^{-1}(\tau S(x_2))\|^2,$$

wherein e is the color matching error, $x_1$ and $x_2$ are corresponding pixel values in the first and the second regions, $R_1$ and $R_2$ are the first and the second regions, S( ) is the OECF, S( )$^{-1}$ is the inverse OECF, and τ is a second color matching parameter.

13. The method of claim 12, wherein said minimizing a color matching error comprises performing a golden section search of the color matching error.

14. The method of claim 13, wherein said performing a golden section search comprises:
(1) initializing the first color matching parameter and a minimum color matching error;
(2) performing the golden section search with the first color matching parameter being fixed and the second color matching parameter being varied to determine a smallest color matching error achieved;
(3) recording values of the first and the second color matching parameters that achieve the smallest color matching error when the smallest color matching error is less than the minimum color matching error;
(4) setting the minimum color matching error equal to the smallest color matching error when the smallest color matching error is less than the minimum color matching error; and
(4) repeating steps (2) to (4) for a range of values of the first color matching parameter.

15. The method of claim 12, wherein said applying the OECF comprises:

$$x_c = S^{-1}(W(\tau, x_o)S(x_o)),$$

wherein $x_o$ is an original pixel value in the second image, $x_c$ is a corrected pixel value in the second image, and W is a weight function defined as:

$$W(\tau, x_o) = \tau + (1-\tau)x_o.$$

16. A method for a processor to color match a first image and a second image, wherein a first region of the first image and a second region of the second image overlap, the method comprising:
removing a percentage of overlapping pixels with the greatest difference in brightness;
generating a first histogram of the first region and a second histogram of the second region after said removing;
histogram matching the first and the second histograms to determine corresponding pixel values from the first and the second histograms;
minimizing a color matching error between the corresponding pixel values, wherein the color matching error is generated from an optoelectronic conversion function (OECF); and
color matching the second image to the first image by applying the OECF to the second image.

17. The method of claim 16, wherein said histogram matching the first and the second histograms comprises generating a lookup table (LUT) as follows:
(1) initializing all entries in the LUT to 0;
(2) initializing a first loop by setting i=0; j=0; rem1=h1[0]; and rem2=h2[0];
(3) updating the LUT by setting min_rem=min(rem1, rem2); rem1=rem1−min_rem; and rem2=rem2−min_rem; and incrementing LUT[i][j] by min_rem;
(4) when rem1=0, then incrementing i and setting rem1=h1[i];
(5) when rem2=0, then incrementing j and setting rem2=h2[j];
(6) when i<256 and j<256, then repeating steps (3) to (5);
wherein h1[ ] is the number of pixels having a certain pixel value in the first histogram, h2[ ] is the number of pixels having a certain pixel value in the second histogram, and LUT[ ][ ] is the number of pairs of corresponding pixel values having a certain pixel value in the first histogram and a certain pixel value in the second histogram.

18. The method of claim 17, wherein the color matching error is defined as:

$$e = \sum_{i=0}^{255} \sum_{j=0}^{255} LUT[i][j]((i+1)/256.0 - S^{-1}(\tau S((j+1)/256.0))),$$

wherein e is the color matching error, τ is a color matching parameter, $S^{-1}$( ) is the inverse of the OECF, and S( ) is the OECF defined as:

$$S(x) = x + \frac{2}{\pi}\arctan\left(\frac{a\sin(\pi x)}{1 - a\cos(\pi x)}\right),$$

wherein x is a pixel value normalized to (0,1), and a∈(−1,1) is another color matching parameter.

19. The method of claim 18, wherein said minimizing a color matching error comprises performing a golden section search of the color matching error comprising:
(1) initializing the another color matching parameter and a minimum color matching error;
(2) performing the golden section search with the another color matching parameter being fixed and the color matching parameter being varied to determine a smallest color matching error achieved;
(3) recording values of the color matching parameter and the another color matching parameter that achieve the smallest color matching error when the smallest color matching error is less than the minimum color matching error;

(4) setting the minimum color matching error equal to the smallest color matching error when the smallest color matching error is less than the minimum color matching error; and (5) repeating steps (2) to (4) for a range of values of the another color matching parameter.

20. The method of claim 19, wherein said applying the OECF to the second image comprises:

$$x_c = S^{-1}(W(\tau, x_o)S(x_o)),$$

wherein $x_o$ is an original pixel value in the second image, $x_c$ is a corrected pixel value of the second image, and W is a weight function defined as:

$$W(\tau, x_o) = \tau + (1-\tau)x_o.$$

* * * * *